(12) United States Patent
Malinen

(10) Patent No.: US 9,306,681 B2
(45) Date of Patent: Apr. 5, 2016

(54) SYSTEM AND METHOD OF ON-BODY MOBILE DEVICES TO REDUCE RADIATION EXPOSURE TO THE UPPER BODY

(76) Inventor: Eric James Malinen, Washington, DC (US)

(*) Notice: Subject to any disclaimer, the term of this patent is extended or adjusted under 35 U.S.C. 154(b) by 81 days.

(21) Appl. No.: 12/929,307

(22) Filed: Jan. 13, 2011

(65) Prior Publication Data

US 2012/0184215 A1 Jul. 19, 2012

(51) Int. Cl.
*H04B 7/00* (2006.01)
*H04B 17/23* (2015.01)

(52) U.S. Cl.
CPC ...................................... *H04B 17/23* (2015.01)

(58) Field of Classification Search
None
See application file for complete search history.

(56) References Cited

U.S. PATENT DOCUMENTS

| | | |
|---|---|---|
| 5,440,559 A | 8/1995 | Gaskill |
| 5,621,798 A | 4/1997 | Aucsmith |
| 5,814,798 A | 9/1998 | Zancho |
| 5,897,040 A | 4/1999 | Ward |
| 5,913,163 A | 6/1999 | Johansson |
| 6,085,076 A | 7/2000 | Lindsay et al. |
| 6,192,253 B1 | 2/2001 | Charlier et al. |
| 6,212,414 B1 | 4/2001 | Almeh et al. |
| 6,343,220 B1 | 1/2002 | Van Der Salm |
| 6,606,506 B1 | 8/2003 | Jones |
| 6,766,175 B2 | 7/2004 | Uchiyama |
| 6,774,795 B2 | 8/2004 | Eshelman et al. |
| 6,885,848 B2 | 4/2005 | Lee |
| 7,003,261 B2 | 2/2006 | Dietz et al. |
| 7,024,552 B1 * | 4/2006 | Caswell et al. ............... 713/155 |
| 7,031,657 B2 | 4/2006 | Tehrani |
| 7,295,530 B2 | 11/2007 | Chu et al. |
| 7,299,034 B2 | 11/2007 | Kates |
| 7,349,691 B2 | 3/2008 | Karr et al. |
| 7,485,885 B2 | 2/2009 | Dandurand |
| 7,565,187 B1 | 7/2009 | Dynok et al. |
| 7,606,182 B2 | 10/2009 | Park et al. |
| 7,606,588 B2 | 10/2009 | Griffin |
| 7,693,542 B2 | 4/2010 | Mauney et al. |
| 7,720,021 B1 | 5/2010 | Zhou et al. |
| 7,761,051 B2 | 7/2010 | Lee |
| 7,965,979 B2 | 6/2011 | Waxman |

(Continued)

FOREIGN PATENT DOCUMENTS

| | | |
|---|---|---|
| CA | 2298201 A1 | 8/2001 |
| EP | 0378450 A2 | 7/1990 |

(Continued)

*Primary Examiner* — Zhiyu Lu
(74) *Attorney, Agent, or Firm* — Albert W. Watkins; Young & Thompson

(57) ABSTRACT

A system of mobile devices that reduces the transmission strength of outgoing signals originating from a handheld device, and sends such signals to a second device, situated near or on a lower-body location, where the signals may be amplified to the current permitted maximum transmission strength vis-a-vis the brain (SAR), or above that level to the greater maximum strength permitted in the areas of, e.g., the feet and ankles, where the signal is then sent outward. The devices divert radio frequency (RF) radiation exposure downward toward the lower extremities. The intelligence and power of the devices may be split between two or more devices, resulting in longer use time, deeper and more complex computing capability, and fewer disruptions due to power. In addition, a benefit in one or more embodiments is better, more reliable reception, due to the use of two or more coordinated receiving antennas.

13 Claims, 1 Drawing Sheet

(56) References Cited

U.S. PATENT DOCUMENTS

| | | |
|---|---|---|
| 8,090,366 B2 | 1/2012 | McNamara et al. |
| 8,116,724 B2 | 2/2012 | Peabody |
| 8,121,564 B2 | 2/2012 | Behzad |
| 8,150,312 B2 | 4/2012 | Bappu et al. |
| 8,190,214 B2 | 5/2012 | Kimura et al. |
| 8,208,932 B2 | 6/2012 | Sayers et al. |
| 8,238,945 B2 | 8/2012 | Rooks et al. |
| 8,244,181 B2 | 8/2012 | Shuo |
| 8,260,214 B2 | 9/2012 | Marlett et al. |
| 8,265,707 B2 | 9/2012 | Carmichael et al. |
| 8,284,740 B2 | 10/2012 | O'Connor |
| 8,285,205 B2 | 10/2012 | Ibrahim et al. |
| 8,289,918 B2 | 10/2012 | McNamara et al. |
| 8,396,764 B1 | 3/2013 | Macaluso |
| 8,463,288 B2 | 6/2013 | Hyde et al. |
| 8,478,208 B2 | 7/2013 | Martin, II |
| 8,583,035 B2 | 11/2013 | Xin et al. |
| 8,605,658 B2 | 12/2013 | Fujimoto |
| 8,694,054 B2 | 4/2014 | Tasker |
| 8,787,308 B2 | 7/2014 | Yee |
| 2004/0077382 A1 | 4/2004 | Verity |
| 2005/0280546 A1 | 12/2005 | Ganley |
| 2007/0099626 A1* | 5/2007 | Lawrence et al. .......... 455/456.1 |
| 2008/0220815 A1 | 9/2008 | Badia I Farre |
| 2008/0274775 A1 | 11/2008 | Boyle |
| 2009/0053998 A1 | 2/2009 | Krupenkin |
| 2009/0207014 A1* | 8/2009 | Ayed ....................... 340/539.13 |
| 2009/0237321 A1 | 9/2009 | Lin et al. |
| 2009/0275283 A1 | 11/2009 | Zhuyan |
| 2010/0093354 A1* | 4/2010 | Agashe et al. ................ 455/436 |
| 2010/0159916 A1 | 6/2010 | Ezer et al. |
| 2010/0178913 A1* | 7/2010 | Herbert et al. ............. 455/426.1 |
| 2010/0245585 A1* | 9/2010 | Fisher et al. .................. 348/164 |
| 2011/0309945 A1* | 12/2011 | Hyde et al. ................. 340/686.6 |
| 2012/0063415 A1* | 3/2012 | Yee ............................... 370/331 |
| 2013/0044215 A1 | 2/2013 | Rothkopf et al. |

FOREIGN PATENT DOCUMENTS

| | | | |
|---|---|---|---|
| GB | 2336966 A | 11/1999 | |
| GB | 2353433 A | 2/2001 | |
| GB | 2364846 A | 2/2002 | |
| GB | 2365699 | * 2/2002 | .............. H04Q 7/32 |
| WO | 00/62431 A1 | 10/2000 | |

* cited by examiner

SYSTEM AND METHOD OF ON-BODY MOBILE DEVICES TO REDUCE RADIATION EXPOSURE TO THE UPPER BODY

BACKGROUND

Cellular telephones, laptop computers, and a wide variety of similar mobile devices use radio frequency (RF) radiation to connect to and/or communicate with other users, entities, and networks using the public switched telephone network, the Internet, private networks, public safety networks, and other transmission paths and networks. Studies on the effects of RF radiation to the human body have, for some time, been controversial and not, arguably, conclusive. Much difficulty has attended the building and use of newer and ever-larger and more comprehensive arrays of antennas such as cellular telephone "cell" antennas, and the production and use of ever-smarter and often more powerful and complex cellular telephones and other mobile devices.

As a result, mobile communication devices such as cellular telephones have recently evolved not only for the transmission of voice as was the original intent, but also for the transmission of text, data, and multimedia. Thus, a cellular telephone is a misnomer and such devices should more aptly be referred to as a wireless personal digital assistant (PDA) or a mobile computer. Due, at least in part, to this technological evolution, the use of mobile communication devices has increased exponentially.

Nevertheless, mobile communication devices continue to present problems. Many issues relate to the effects on children, and it is thought that, for all users, the most vulnerable body parts might be the brain, eyes, and groin. For example, one problem is the radiated electromagnetic fields that might affect a user's brain when hand-held devices are held in close proximity to the user's head. In order to address this problem, at least in part, the Federal Communication Commission (FCC) has set radio frequency (RF) exposure guidelines that recommend a maximum permissible exposure level. Specifically, the FCC has established a specific absorption rate (SAR) of 1.6 milliwatts per kilogram (W/kg) or less. The term SAR as used herein is the amount of energy of an electromagnetic wave transmitted by a wireless transceiver, such as a mobile telephone, during a phone call and absorbed by a specific part (especially, a head) of a human body for six minutes, and is measured as an average over a 10-gram cube of a human tissue.

Despite communication companies developing devices that are in compliance with the FCC guidelines, there is a growing concern that health problems (such as brain cancer) might be attributed to use of the aforementioned mobile communication devices.

To address concerns over the amount of energy of electromagnetic waves transmitted by wireless transceivers, various studies have been performed to analyze the electromagnetic interaction of handset antennas and a user. These studies have resulted in suggestions for an improved design of the handset antenna. In addition, proposals exist for attempting to solve the absorption by a user's body, and its health consequences, such as brain cancer. See U.S. Pat. No. 7,031,657 to Tehrani and U.S. Patent Application Publication No. 2010/0159916 to Ezer at al. that both use an intermediate transceiver between a mobile device and a main antenna of a cellular telephone network that operates at a different frequency/intensity than the mobile device.

Shielding devices are also used in an attempt to reduce radiation, and many patents have been issued that include an antenna shield. See U.S. Pat. No. 6,075,977. However, due to proximity of the antenna to the user's body, the radiation problem still exists. In addition, the shield might adversely affect reception of the antenna, which could lead to an increase in absorption of energy because the cellular telephone attempts to compensate for the reduced reception. Thus, shielding by itself is not necessarily an optimal solution for radiation exposure.

Accordingly, alternative solutions have been proposed in an attempt to reduce radiation exposure. As is recognized in the art, the farther away the user's body is from the antenna, the less power absorption by the user's body. Thus, many prior art solutions propose to increase the distance between an antenna and the user. This approach is somewhat helpful to reduce the radiation absorbed by the user by increasing the distance between the user and the antenna. This is often achieved using a short wire, which limits the positioning of the handset with a maximum distance of arm's length to the brain. Alternatively, a wireless headset might be used, which lets the user roam around the office with the headset using short-range communication such as Bluetooth technology. However, most of these systems are not practical for a user walking in the street, for example.

However, none of the above mentioned references improve the performance of the mobile electronic devices that use long-range radio frequency (RF) communication, while reducing the SAR level at the head of the user of the mobile device.

Thus, there clearly exists a need for an efficient, yet compact and simple device capable of retransmitting RF communication signals received from mobile electronic devices that improves the performance of the mobile devices, and also reduces the SAR of such mobile devices at the head of the user.

SUMMARY

A method and system are presented to reduce the radiation absorbed by the head of the user of mobile or wireless computing or communication devices, such as cellular telephones, and push this radiation down or away from the upper portion of the body such as the head (brain and eyes) and extending as far down as, for example, the groin, toward an extremity such as a foot or ankle so that the usage of these mobile devices become safer for the users.

One embodiment pushes RF radiation systematically toward the feet and ankles, or at least toward the lower extremities, and adds the use of one or more "lower" devices to the current use of the "upper" mobile device or devices (current and future cellular telephones and smart phones, mobile computers, etc.). The lower devices might be connected to the lower body using clips, hook and loop-type fastening straps, or other fasteners, which can be permanent or removable, or might be otherwise attached to, or built-in to, clothing, or even attached more permanently to the lower body. The "lower" devices might also be temporarily set aside while being used (away from the body), to provide even greater protection. Preferred embodiments provide, at least in part, a systematic and effective way to reduce RF radiation while permitting the "above" device or devices to operate in much the same way that existing cellular telephones operate today, and to provide greater flexibility in the development of future "above" uses, devices, and means of operation.

Another embodiment might provide added power and capabilities, beyond what is currently available, in appropriate contexts. For instance, FCC regulations concerning the maximum permissible RF radiation exposure to the body (the "specific absorption rate (SAR)") permit a larger maximum for, e.g., feet and ankles. In one embodiment, significant power transmissions of the subject wireless system are pushed downward to take advantage of this larger maximum SAR, to achieve greater transmitting power and overall capabilities. Another embodiment takes advantage of a similarly increased maximum when devices are used in the "occupational/controlled" context, which yields the highest permitted SAR for on-body use (Federal Governmental use, including military, may go higher yet.) In this context, it can be noted that the U.S. military is currently considering the use of off-the-shelf "smart phones" in combat, yet is faced with power/reception and capabilities limitations. A proposed embodiment could assist in overcoming these problems while keeping troops potentially safer.

Should a mobile device user choose to operate a device according to one of the disclosed embodiments, other significant benefits might be achieved, as described more fully below. In brief, splitting-up or duplicating capability between the upper device or devices, and the lower device or devices, can yield benefits currently unavailable. For instance, the overall, combined power of the devices (from batteries, solar, locomotion, etc.) may be increased, as the devices share functions. For example, the upper device(s) might take and process photos, while the lower device(s) store(s) the photos. Another additional benefit might be the use of safety/security alarms and shut-offs, where the upper and/or lower devices would, for example, alert the user that the upper device is being used in full-power mode, or that one device has been separated from the others beyond a predetermined distance, or that the battery level of a device is too low. Sophisticated, automatic functions might be created, such as having the lower device go into emergency text-only mode when the upper device has almost run out of power. Receipt of signals can also be more effective, as multiple receipt sites are used. With future advances in miniaturization, power, capability, and functioning on all fronts being inevitable in the context of mobile devices, the added use of one or more lower coordinated or synchronized devices will allow such advances to be fuller, and more readily available.

In one embodiment, a mobile system is used to push downward radio frequency (RF) communication signals generated by at least one mobile electronic device toward a lower portion of a body of a user of the at least one mobile electronic device in order to lower RF radiation exposure at an upper portion of the body of the user. The system includes a first transceiver in the at least one mobile electronic device and arranged to be placed adjacent to the upper portion of the body of the user; and a second transceiver that communicates with the first transceiver, the second transceiver is on the body of the user at a position lower than the first transceiver. The first transceiver is configured to establish RF communication with the second transceiver using low-power, short-range RF communication signals, and the second transceiver is configured to boost a signal strength of the short-range RF communication signals to high-power, long-range communication signals that are up to or above permissible specific absorption rate (SAR) levels as established by the Federal Communication Commission (FCC) and then to retransmit the long-range RF communication signals to a wide area network, so that the RF radiation exposure at the upper portion of the body of the user is reduced.

BRIEF DESCRIPTION OF THE DRAWINGS

Other embodiments and variations/details are described, by way of example, with respect to the following detailed description taken in conjunction with the accompanying figures, in which.

DETAILED DESCRIPTION OF EMBODIMENTS

Figure 1:
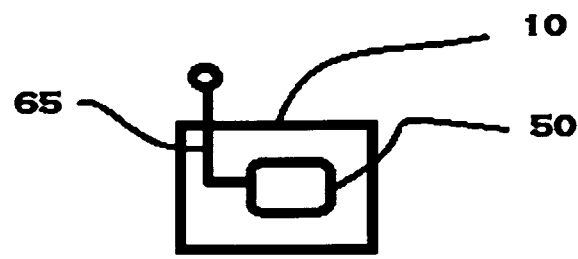
FIG. 1 shows a transceiver according to an embodiment.

Below is described embodiments for a solution for any mobile/wireless/remote-access/satellite-access phone, cellular telephone, communication device, computation device, pager, radio, personal digital assistant (PDA), gadget, global positioning system, hand-held device, appliance, personal computer (PC), computer, laptop computer, tablet, netbook, reader, any one-way or two-way communication system, hand-held gaming device, mobile gambling device, geosynchronous position system (GPS) device, satellite emergency line, navigation device, tracking device, broadcasting device, or narrowcasting device, or any other known mobile electronic device 10, as seen by way of example in FIG. 1. Such device might include a transmitter, a receiver, or a transceiver 50 and at least one antenna 65.

Disclosed is a method and systems to decrease the radiation absorbed by a head of the user. As noted above, radiation absorption is typically measured based on specific absorption rate (SAR). The SAR is a value that corresponds to the relative amount of radio frequency (RF) energy absorbed in the head of a user of a wireless handset. The FCC limit for public exposure from cellular telephones is a SAR level at the head of 1.6 watts per kilogram (1.6 W/kg). Although the limit is 1.6 W/kg, nevertheless, the below embodiments are meant to encompass from just above zero to 1.6 W/kg, unless otherwise described.

Figure 2:
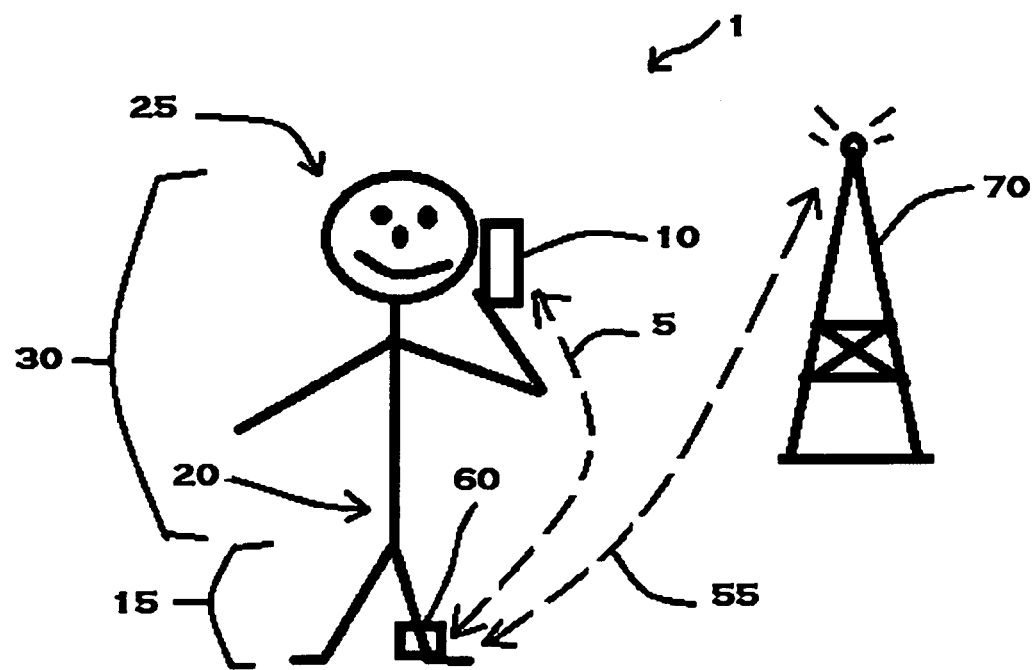
FIG. 2 shows a system according to an embodiment.

In one embodiment, as depicted by way of example in FIG. 2, a mobile system 1 is described that pushes downward RF communication signals 5 generated by at least one mobile electronic device 10 toward a lower portion 15 of a body 20 of a user 25 of the at least one mobile electronic device in order to lower RF radiation exposure at an upper portion 30 of the body 20 of the user 25. The upper portion includes an area between the groin and the head as seen in FIG. 1. A first transceiver (see FIG. 1) of the at least one mobile electronic device 10 is configured to be placed on or adjacent to the upper portion 30 of the body 20 of the user 25 and might be a hand-held device such as a cellular telephone. A second transceiver 60 communicates with the first transceiver 50. In one embodiment, the first transceiver 50 is a conventional cellular telephone that is modified in order to communicate with the second transceiver 60 and might include a switch in order to operate as a conventional cellular telephone (without using the second transceiver 60). Thus, in one embodiment, the first transceiver includes all the features of a conventional cellular telephone including at least a camera, display, speakers, circuitry/software for computing and Internet access, adequate internal power (e.g. battery), microphone and circuitry/software for voice activation, and might be modified to include a switch or setting to permanently or by default (that is changeable by a user) communicate with the second transceiver 60.

The second transceiver 60 is configured to be directly on the body 20 of the user 25 or at a small distance (about one inch or less) from the body 20 at a position (lower portion 15 between the groin and the feet including lower extremities) lower than the first transceiver 50. The second transceiver 50 might be connected to the lower body using clips, hook and loop-type fastening straps, or other fasteners, which can be permanent or removable, or might be otherwise attached to, or built-in to, clothing, or even attached more permanently to the lower body. The first transceiver 50 (in the FIG. 2 embodiment) is configured to establish RF communication with the second transceiver 60 using low-power, short-range RF communication signals 5. The second transceiver 60 (in the FIG. 2 embodiment) is configured to boost a signal strength of the short-range RF communication signals 5 to high-power, long-range communication signals 55 that are up to or above permissible specific absorption rate (SAR) level limits as established by the Federal Communication Commission (FCC) and then to retransmit the long-range RF communication signals 55 to a wide area network or cellular tower 70, so that the RF radiation exposure at the upper portion 30 of the body 20 of the user 25 is reduced. As discussed above the permissible SAR level limit at the head is 1.6 W/kg.

For example, for a two-stage case, between the first transceiver and the second transceiver 60 (see FIG. 2), the initial transmission link might be at a relatively low power, for a relatively short range, for example, a chosen or default maximum range of 10, 20 or 30 feet. Therefore, the first transceiver 50, which in the embodiment of FIG. 2, is on or adjacent to the user's head, might have an extremely low power, which is defined as not exceeding a radiated power of 120 milliwatt (mW). Common examples of such low-power, short-range RF communication signals include, but are not limited to, those signals that conform to Bluetooth RF communication standard, signals that conform to Wibree RF communication standard and signals that conform to WiFi RF communication standard. As discussed, the first transceiver might use that are other than short-range RF communication signals.

Then, the second transceiver 60 (or last transceiver) transmits the data to a cellular tower 70 at a relatively high power, possibly even an increased power as compared to a conventional cellular telephone (that is, with a conventional cellular telephone currently at up to a permissible 1.6 W/kg). The term cellular tower as used herein is not meant to limit the disclosed embodiments and rather, as recognized by one of ordinary skill in the communications art, a cellular tower might include any device that is capable of transmitting/receiving high-power, long-range communication signals that are in excess of 120 mW and that conform to, for example, the CDMA wide area cellular telephone network communication standard, GSM wide area cellular telephone network communication standard, any one of the International Telecommunication Union (ITU) wide area cellular telephone network family of standards developed under the International Mobile Telecommunications program (IMT-2000) including 2G, 2.5G, 3G, 3.5G, and 4G standards, and WiMAX wide area network RF communication standard. Similarly, the term cellular tower is meant to encompass any remote location or recipient of the signals.

As discussed above, increasing the distance between the user's head and the second transceiver 60 operating at a power up to or above 1.6 W/kg, the power absorption by the user's head is decreased drastically (by many orders of magnitude), which means relatively safe operation of the cellular telephone by the user. In the embodiment of FIG. 2, the user is standing and holding the first transceiver 50 in the embodiment of a cellular telephone on or adjacent to his ear and the second transceiver 60 is around the user's ankle. However, alternative embodiments are envisioned including the first transceiver as a cellular telephone held in the user's hand at a distance from the head while the user is standing; held at a distance from the user or in a lap of the user while the user is in a seated position. Alternatively, the first transceiver 50 might be in the form of a personal computer placed in front of the user when the user is in a seated position. The second transceiver would then be in any lower position, including on or near the ankle, on or near the foot or attached to a part of the leg such as the knee or thigh, or any other portion of the body that might be considered as an extremity including the arms and legs. Alternatively, the second transceiver might be attached to an article of the user's clothing, such as a trouser leg, a leg of a pair of shorts, or on a sock or shoe. Such embodiments depict typical uses and show how the proposed system systematically lengthens a distance from, for example, the brain and potentially harmful RF radiation.

However, the FCC allows different limits at different parts of the body. Specifically, at the extremities such as the foot or ankle, the SAR level limit can be as high as 4 watts per kilogram (4 W/kg) for personal use devices such as cellular telephones ("general population/uncontrolled exposure"), and as high as 20 W/kg for devices for certain commercial uses ("occupational/controlled" contexts). In the latter use, the level at the brain is also higher (8 W/kg). As noted previously, Federal Governmental use (e.g. military) might be even higher; such use would not be regulated by the FCC and Federal frequencies could be utilized.

Thus, it would be permissible to increase the SAR value above 1.6 W/kg for transmission away from the head. This might be accomplished by using an embodiment wherein transmission occurs in two (or more) stages, as in the embodiment of FIG. 2, described above with a transmission having a SAR level of about 4 W/kg.

In one embodiment, for either the 1.6 W/kg transmission or for higher transmission levels, this concept can be extended to multiple, more than two transceivers. Either two or more first transceivers 50 or two or more second transceivers 60, or even two or more first transceivers 50 and two or more second transceivers 60. In one preferred embodiment, all transceivers are in a network, and cover an area. In another preferred embodiment, the transceivers are positioned in parallel, and transmit the data in parallel. In another preferred embodiment, the transceivers are positioned in series, for example, to extend the range of reception or to overcome a physical barrier, in which case the last transceiver is the one sending/receiving the data to the cellular tower. In another embodiment, different power can be used for each part of the transmission. In yet another embodiment, the first transceiver 50 includes a switch in order to directly communicate with the cellular tower 70 using long range communication and thus would operate like a conventional cellular telephone.

As described above, the second transceiver 60 might be on or slightly spaced from the body. This might be accomplished using any known, filter, shield or buffer, including shields that can be selected such that one frequency can be filtered, but not the others (selective shielding/filtering based on different frequencies and different materials). Such filter, shield or buffer could somewhat or largely protect, for example, the ankle from RF radiation emanating from transceiver 60.

The communication between transceivers, components, or sub-systems can be in any form, such as wired, wireless, or any combination of those, using electromagnetic radiation of any wavelength (such as visible light, laser, invisible light, X-ray, ultra-violet, infra-red, or pulsed light) or any other types of data communication means (such as sound waves or magnetic). The communication can be for any kind of information, data, or code (such as text, voice, music, financial information, computer codes, executable codes, multimedia, video, Morse codes, encrypted data, unencrypted data, compressed data, uncompressed data, computer commands, real-time gaming or gambling, or fund transfers). The transceivers might include any kind of antennas 65 (such as retractable, with extension, outside-of-the-housing, inside-of-housing, straight, curved, zigzag-patterned, square-patterned, circular-patterned, in array-form (multiple antennas), micro-antenna, on-substrate, on-chip, with spring-action, spiral/ring/coilshaped, helical-shaped, dish-shaped, directional, non-directional, focused, multi-frequency, on-the-car, in-the-car, inside-the-glass, attached-to-a-balloon, on-a-helmet, on-a-watch, on-a-toy, on-a-robot, on-the-ear, in-the-ear, ear-piece, head-set, regular (conventional) handset, on-umbrella, on-eyeglasses (or their frames), on-another-antenna, inside-the-transceiver, hidden, or in (or on, or in the shape of) any one-dimensional, two-dimensional, and three-dimensional structures).

In one embodiment, the keypad, keyboard, number pad, mouse, speaker, microphone, display, LCD, or screen might be on first transceiver 50, second transceiver 60, or both. In one embodiment, first transceiver 50 and second transceiver 60 might be configured so that some functions are done "below" and the power for these functions comes from a lower power device such as a lower battery or batteries. In this way, for example, the first transceiver 50 might include only a battery, a speaker, a display screen and possibly a camera, with all other functions done "below" in the second transceiver 60. Devices can gauge their respective power levels, and devices can warn when levels are low. With some intelligence features done "below," battery life can be preserved. With miniaturization of batteries, much power can be stored below. In addition, power can be monitored so that when battery power is low, at least the first transceiver 50 might still have text sending capabilities, or text receiving capabilities. Low battery power also might be sufficient to enable roaming power for someone to track the location of the transceiver. In addition to battery power or as an alternative thereto, power also may be taken and converted from, e.g., solar, locomotion, and use of incoming RF signals.

In another embodiment, the second transceiver 60 could undertake most or all of the intelligence/computing functions and send results as necessary upward to the first transceiver 50. In one such embodiment, the first transceiver 50 might only have the ability to receive and be in the form of, for example, an FM radio. Also, "lower" second transceivers could assist with storage, freeing up the upper first transceiver for other functions. For instance, the first transceiver 50 (upper device) can use power for photography, while the power and intelligence necessary for processing and storing the photography is done in the second transceiver 60 "below."

In the embodiment of FIG. 2, there are two transceivers, which will assist reception by having two receivers total—one up as part of the first transceiver 50 and one down as part of the second transceiver 60. As discussed above, a third transceiver (or more), might be used for even better reception. Similarly, using multiple transmitters, including transmission in tandem, can result in a more effective and powerful transmission. This might, for example, double or triple the power, and be especially helpful for Federal Military or Federal Park operations.

In another embodiment, at least the second transceiver might contain alarms. These alarms might include audible and/or visible signals which signal when the first transceiver is switched for use as a conventional cellular telephone. The alarms also might signal when lower RF use is activated, yet the two (or more) transceivers are separated to too great of an extent; or when one of the transceivers is not powered on, or is underpowered. Also, the system can be programmed not to work in full power (not lowered) mode, or not to work without, e.g., passwords, if the transceivers are separated for a length of time. As an alternative to an alarm, or in conjunction therewith, when the first transceiver 50 is switched for conventional use, or for any of the other embodiments when the second transceiver 60 is activated, either the first transceiver 50, the second transceiver 60 or both might function with adaptive power control in order to vary power to less than or equal to 1.6 W/kg (or to a higher limit, as previously noted). In this way, the RF is monitored and when an upper limit is reached (e.g., greater than 1.6 W/kg) the cellular telephone could drop a call or power off to prevent the exposure to the higher RF levels.

In another embodiment, the first transceiver 50 might be configured to switch from receiving signals from the second transceiver 60 and receive signals from a permanently mounted device such as a femtocell, picocell, or microcell (and switch again). In this embodiment, the second transceiver 60 would shut-off, or operate in a stand-by mode. Alternatively, the second transceiver 60 would continue seamlessly on the newly encountered network, effectuating a hand-off.

Another embodiment is directed to a method of use. The method reduces RF radiation exposure at an upper portion of a body of a user of a mobile device and includes locating a transceiver on a portion of the body of the user that is lower than the upper portion of the body of the user; communicating low-power, short-range RF communication signals between the transceiver and the mobile device; boosting a signal strength of the short-range RF communication signals at the transceiver to a range that is within permissible specific absorption rate (SAR) levels as established by the Federal Communication Commission (FCC), that is, up to 1.6 W/kg at the head, or greater; and transmitting high-power, long-range. RF communication signals to a wide area network using the transceiver, so that the RF radiation exposure at the upper portion of the body of the user is reduced. Of course, the method also includes modifications as discussed above in connection with each of the system embodiments.

The disclosed embodiments provide at least two transceivers that are configured to push RF radiation toward the lower extremities and away from the brain, eyes, and groin. In addition to reduced RF exposure, the devices provide advantages, including having settings that result in prior art use of at least one of the devices. Further, the position of the second device "below" enables the system to use low RF on, near or adjacent to the upper body and boost it "below" to normal strength associated with permissible SAR and/or boost it to a larger SAR limit (FCC) due to exceptions in regulations for ankle and foot SAR. Since some functions are done "below," the power for these functions comes from the lower battery or batteries or other low power sources so that power can be preserved. Miniaturization of batteries will likely assist in this. The "lower" device(s) can also assist with storage and intelligence/computing/processing, freeing up the first device for other functions. In this way, the upper device might resemble the so-called "Dick Tracy" watch (phone) in which all intelligence/processing is done at the "lower" device and not at the phone (mobile device). Further, using a second device, on the lower extremities, can assist reception by having at least two receivers.

Although the above embodiments have been described in detail, those of ordinary skill in the art should understand that they could make various changes, substitutions and alterations herein without departing from the intended scope.

I claim:

1. A mobile system for pushing downward radio frequency (RF) communication signals generated by at least one mobile electronic device toward a lower portion of a body of a user of the at least one mobile electronic device in order to lower RF radiation exposure at a head or an upper portion of the body of the user, comprising:

at least one first transceiver in the at least one mobile electronic device and arranged to be placed on or adjacent to the head or the upper portion of the body of the user; and at least one second transceiver that communicates with the at least one first transceiver, the at least one second transceiver being on the body of the user at a position lower than the at least one first transceiver, wherein the at least one first transceiver is configured to establish RF communication with the at least one second transceiver using low-power, short-range RF communication signals, wherein the at least one second transceiver is configured to boost a signal strength of the short-range RF communication signals to high-power, long-range communication signals and then to retransmit the long-range RF communication signals to a remote recipient, so that the RF radiation exposure at the head or the upper portion of the body of the user is reduced; and wherein the at least one second transceiver switches into emergency text-only mode when the at least one first transceiver has almost run out of power.

2. The mobile system according to claim 1, further comprising at least one of a buffer, shield or filter between the lower portion of the body of the user and the at least one second transceiver, to lessen the RF radiation to a closest body part.

3. The mobile system according to claim 1, wherein the at least one second transceiver is configured to use adaptive power control to vary power so as to control and/or cap the SAR of the long-range signals to less than or equal to 1.6 W/kg.

4. The mobile system according to claim 1, wherein the at least one second transceiver is integral with or directly attached to an exterior surface of one of a shoe, a sock and an anklet of the user.

5. The mobile system according to claim 1, wherein the at least one first transceiver comprises a switch that enables the at least one first transceiver to directly receive and transmit the long-range RF communication signals.

6. The mobile communication system according to claim 1, wherein the at least one first transceiver is placed immediately adjacent to an ear of the user, and wherein the at least one second transceiver is on a leg of the user.

7. The mobile communication system according to claim 1, wherein the at least one mobile device comprises one of a cellular telephone, a tablet, a netbook, a laptop computer, a reader, a hand-held gaming device, a mobile gambling device and a geosynchronous position system (GPS) device.

8. The mobile communication system according to claim 1, wherein the SAR of the long-range signals is greater than 1.6 W/kg.

9. The mobile system according to claim 1, wherein there are at least two first transceivers.

10. The mobile system according to claim 1, wherein the mobile system, utilizing multiple transceivers, is adjustable to utilize higher than normal SAR capabilities or higher federal agency or military SAR Possibilities.

11. The mobile system according to claim 1, wherein the mobile system, utilizing multiple transceivers, has multiple battery or other internal power capability.

12. The mobile system according to claim 1, wherein the mobile system, utilizing multiple transceivers, has multiple, enhanced reception capability.

13. The mobile system according to claim 1, wherein the at least one mobile electronic device comprises an on-body cellular telephone, and the at least one second transceiver comprises an on-body cellular telephone, the cellular telephones working together synergistically, in tandem, to accomplish in real time voice calls and messaging.

* * * * *